(12) United States Patent
Ganschow et al.

(10) Patent No.: US 8,703,865 B2
(45) Date of Patent: *Apr. 22, 2014

(54) METHOD FOR PRODUCTION OF POLYMER-ENCAPSULATED PIGMENTS

(75) Inventors: Matthias Ganschow, Wiesbaden (DE); Hans Joachim Metz, Darmstadt (DE); Ulrike Rohr, Mannheim (DE); Karl-Heinz Schweikart, Eschborn (DE); Katharina Landfester, Ulm (DE)

(73) Assignee: Clariant Finance (BVI) Limited, Tortola (VG)

( * ) Notice: Subject to any disclaimer, the term of this patent is extended or adjusted under 35 U.S.C. 154(b) by 1015 days.

This patent is subject to a terminal disclaimer.

(21) Appl. No.: 11/587,879

(22) PCT Filed: Apr. 21, 2005

(86) PCT No.: PCT/EP2005/004258
§ 371 (c)(1),
(2), (4) Date: Oct. 27, 2006

(87) PCT Pub. No.: WO2005/105931
PCT Pub. Date: Nov. 10, 2005

(65) Prior Publication Data
US 2007/0227401 A1     Oct. 4, 2007

(30) Foreign Application Priority Data
Apr. 28, 2004   (DE) .......................... 10 2004 020 726

(51) Int. Cl.
C08F 2/32       (2006.01)
C04B 14/00      (2006.01)

(52) U.S. Cl.
USPC .............................. 524/801; 524/80; 106/400

(58) Field of Classification Search
USPC ...................... 524/801, 80; 526/214; 106/400
See application file for complete search history.

(56) References Cited

U.S. PATENT DOCUMENTS

| | | | |
|---|---|---|---|
| 3,544,500 A | * 12/1970 | Moody et al. | 428/402.24 |
| 5,120,632 A | * 6/1992 | Bertrand et al. | 430/110.2 |
| 5,863,696 A | 1/1999 | Koyama et al. | |
| 6,129,786 A | 10/2000 | Camara et al. | |
| 2002/0032242 A1 | 3/2002 | Antonietti et al. | |
| 2002/0131941 A1 | 9/2002 | Habeck et al. | |
| 2004/0143040 A1 | 7/2004 | Metz et al. | |
| 2007/0224345 A1 | * 9/2007 | Metz et al. | 427/212 |

FOREIGN PATENT DOCUMENTS

| | | | |
|---|---|---|---|
| DE | 19852784 | 5/2000 | |
| DE | 19821665 | 3/2002 | |
| EP | 0209879 | 1/1987 | |
| EP | 576844 A1 * | 1/1994 | C08J 3/16 |
| EP | 1006161 | 6/2000 | |
| EP | 1191041 | 3/2002 | |
| EP | 1371688 | 12/2003 | |
| WO | WO 99/63006 | 12/1999 | |

OTHER PUBLICATIONS

English Translation of International Preliminary Report on Patentability for PCT/EP2005/004258, mailed Feb. 8, 2007.
Co-pending U.S. Appl. No. 11/717,989 by Metz et al., filed Mar. 14, 2007.
PCT International Search Report for PCT/EP 2005/004258, mailed Aug. 17, 2005.
PCT International Report on Patentability for PCT/EP 2005/004258, mailed Oct. 16, 2006.
S. Lelu et al., "Encapsulation of an Organic Phthalocyanine Blue Pigment into Polystyrene Latex Particles using a miniemulsion Polyerization Process," Polymer International, vol. 52, No. 4, pp. 542-547; Apr. 2003.
Tiarks et al., "Encapsulation of Carbon Black by Miniemulsion Polymerization," Macromolecular Chemistry and Physics, vol. 202, No. 1, pp. 51-60, Jan. 25, 2001.

* cited by examiner

*Primary Examiner* — Hannah Pak
(74) *Attorney, Agent, or Firm* — Anthony A. Bisulca

(57) ABSTRACT

The invention relates to a method for production of an aqueous dispersion of polymer-encapsulated pigments characterized in that (a) an aqueous pigment dispersion, containing at least one organic pigment (P) at least one surfactant (T), and water is prepared,(b) a monomer miniemulsion stabilized by a hydrophobic organic compound with a water solubility at 20° C. of not more than $5 \times 10^{-5}$ g/l, is prepared from a polymerizable monomer (M) and at least one surfactant (T), in water, (c) a monomer pigment emulsion is prepared, whereby the aqueous pigment dispersion from (a) and the monomer miniemulsion from (b) are mixed and homogenized, and (d) the pigment-containing monomer miniemulsion from (c) is polymerized in the presence of a polymerization initiator and/or by heat, whereupon an encapsulation of the pigment with the polymer thus formed occurs.

14 Claims, No Drawings

METHOD FOR PRODUCTION OF POLYMER-ENCAPSULATED PIGMENTS

The present invention relates to pigment-containing aqueous polymer dispersions of finely divided, pigment-containing addition-polymer particles and to pigment-containing polymer powders produced from them, and also to their use as colorants in the printing sector and also for use in varnishes and in plastics, ink-jet inks, color filters, and toners.

Colorant-containing polymer dispersions in which the colorant is a soluble dye are known from EP-A-1 191 041. The dye is present in an amount of only 0.5% to 50% by weight, based on the polymer matrix. The polymerization is accomplished by conventional emulsion polymerization, the dye being present in dissolved form in the polymer.

DE-A-198 52 784 describes miniemulsions and microemulsions which are suitable for producing nanohybrid particles. In the case of that method the pigment is dispersed in the monomer, and products are formed which have a very broad particle species distribution (different ratio of pigment to polymer in the individual nanohybrid particles).

EP-A-0 209 879 describes a method of producing pigment-containing polymer dispersions by conventional emulsion polymerization. This method also leads to a broad particle size distribution and to a considerable fraction of empty droplets, referred to as homopolymer particles, denoting formation of pure polymer particles without particulate solids encapsulated therein. In addition it is not possible to obtain high pigment contents (>70%), since with high pigment fractions the solutions become solid.

In the article in *Macromol.Chem.Phys.* 2001, 202, 51-60 there is a description of the encapsulation of carbon black by a miniemulsion polymerization method. Carbon black is a highly apolar material, which is encapsulated with likewise apolar monomers. Encapsulation of polar organic materials, such as organic pigments, with directed interactions, would not be expected by this process.

In the article in *Polymer International* 2003, 52, 542-547 there is a description of the styrene encapsulation of phthalocyanines by a miniemulsion polymerization method. That method too leads to materials having a very broad particle species distribution, since the pigment is dispersed in the monomer.

The object was to provide a method of producing an aqueous, pigment-containing polymer dispersion that produces an extremely small fraction of empty droplets and allows a widely varying pigment fraction while nevertheless producing particles having a narrow particle species distribution.

It has been found that the combination of the method steps below surprisingly achieves the stated object.

The invention provides a method of producing an aqueous dispersion of polymer-encapsulated pigments, which comprises (a) preparing an aqueous pigment dispersion comprising at least one organic pigment P from the group of azo, isoindolinone, isoindoline, anthanthrone, thioindigo, thiazineindigo, triarylcarbonium, quinophthalone, anthraquinone, dioxazine, phthalocyanine, quinacridone, quinacridonequinone, indanthrone, perylene, perinone, pyranthrone, diketopyrrolopyrrole, isoviolanthrone, and azomethine pigments, at least one surfactant T, and water;

(b) providing a monomer miniemulsion which is stabilized via hydrophobic organic compound having a water solubility at 20° C. of not more than $5 \times 10^{-5}$ g/l and which is composed of at least one polymerizable monomer M and at least one surfactant T, in water;

(c) producing a pigment-containing monomer miniemulsion by combining and homogenizing the aqueous pigment dispersion from (a) and the monomer miniemulsion from (b), and (d) polymerizing the pigment-containing monomer miniemulsion from (c) in the presence of a polymerization initiator and/or by heat, accompanied by encapsulation of the pigment with the polymer that forms.

Preparation of the Aqueous Pigment Dispersion (a):

To prepare the aqueous pigment dispersion the pigment P, generally in the form of a powder, granules or presscake, is pasted together with the surfactant T in water and the paste is dispersed with the aid of a grinding or dispersing assembly. The pigment P used is preferably a finely divided, e.g. ground and/or finished pigment, as a powder or presscake. The pigment P is used preferably in an amount of 0.1% to 50%, preferably 5% to 40%, in particular 10% to 30%, by weight based on the total weight of the aqueous weight of the aqueous pigment dispersion.

The surfactants T used to disperse the pigment P may be nonionic, anionic or cationic in kind. In addition it is also possible to use amphiphilic polymer surfactants or else polymerizable surfactants, which then form a constituent of the polymer capsule. The surfactant T is preferably selected from the group of phosphates, carboxylates, polymeric ethoxylates, alkyl ethoxylates, fatty amines, fatty amine ethoxylates, fatty alcohol ethoxylates, fatty acid salts, alkylsulfonates, alkyl sulfates, alkylammonium salts, and sugar ethoxylates.

Examples of particularly preferred surfactants are alkylsulfonates, such as SDS (sodium dodecyl sulfate), alkylammonium salts, such as CTAB (cetyltrimethylammonium bromide), or alkyl ethoxylates.

The surfactant T is used preferably in an amount of 0.1 to 50%, preferably 0.5% to 20%, in particular 1% to 10%, by weight based on the total weight of the aqueous pigment dispersion.

Appropriately the components water and surfactant T are first mixed and homogenized, then the pigment P is incorporated by stirring into the initial mixture, the pigment being pasted and predispersed. Depending on the harshness of grain of the pigments used, the next step, with cooling where appropriate, is to carry out fine dispersion or fine division using a grinding or dispersing assembly. For this purpose it is possible to use agitators, dissolvers (sawtooth stirrers), rotor-stator mills, ball mills, agitator ball mills such as sand mills and bead mills, high-speed mixers, kneading apparatus, roll mills or high-performance bead mills. The fine dispersion and/or grinding of the pigments takes place until the desired particle size distribution is reached and can be accomplished at temperatures in the range from 0 to 100° C., advantageously at a temperature between 10 and 70° C., preferably at 20 to 60° C. Following the fine-dispersing operation the pigment dispersion can be diluted further with water, preferably deionized or distilled water.

Production of Stabilized Monomer Miniemulsion (b):

The monomer miniemulsion is produced by incorporating one or more polymerizable monomers M, preferably at a temperature between 0° C. and 100° C., into an aqueous solution of a surfactant T and, if appropriate, carrying out dispersion, producing an oil-in-water emulsion. If elevated pressure is employed, the temperature can also be up to 120° C.

The polymerizable monomers M are appropriately present in an amount of 0.1% to 80%, preferably 10% to 70%, by weight based on the total weight of said emulsion.

The surfactant T is appropriately present in an amount of 0.1% to 50%, preferably 0.5% to 10%, by weight based on the total weight of the monomers M.

In addition a hydrophobic organic compound having a water solubility at 20° C. of not more than $5 \times 10^{-5}$ g/l, referred to below as ultrahydrophobe, is added.

The ultrahydrophobe stabilizes the droplets osmotically against Ostwald ripening, as a result of a very low water solubility.

Examples of the ultrahydrophobe are hydrocarbons, especially volatile and optionally halogenated hydrocarbons, examples being fluorohydrocarbons, silanes, organosilanes, siloxanes, long-chain esters, oils such as vegetable oils, for instance, an example being olive oil, masked isocyanates, and hydrophobic oligomeric addition-polymerization, polycondensation, and polyaddition products, fatty acid alkyl esters, pentaerythritol triacrylate or trimethacrylate, provided they do not exceed the aforementioned water solubility.

The ultrahydrophobe is appropriately present in an amount of 1% to 50%, preferably 1% to 10%, by weight based on the total weight of the monomers M.

The above-described oil-in-water emulsion generally has average droplet sizes di (intensity average) of above 1000 nm. These conventional "macroemulsions" are then converted by homogenization into monomer miniemulsions having droplet sizes ≤1000 and preferably ≤500 nm, appropriately at a temperature between 0° C. and 100° C. If elevated pressure is employed the temperature can even be up to 120° C.

The homogenization takes place preferably at a temperature between 10° C. and 30° C.

The homogenization is accomplished preferably by use of ultrasound, high-pressure homogenizers or other high-energy homogenizing apparatus. The use of ultrasound has proven particularly advantageous and leads in general to particularly high-grade monomer miniemulsions.

In the course of this "miniemulsification" the apolar oil phase of the monomers M is dispersed in water by means of a surfactant T, using high shearing forces, to form droplets having an average diameter di of ≤1000 nm, preferably ≤500 nm, and in particular ≤400 nm. In general di will be at least 40 nm and preferably at least 100 nm. The droplet size of the monomer miniemulsion is determined by quasi-elastic, dynamic light scattering. The droplets in the monomer miniemulsion preferably have a largely uniform size; in other words the ratio (d90-d10)/d50 has a value ≤1, preferably ≤0.5, in particular ≤0.25.

The Monomers M:

The polymeric matrix for the pigment encapsulation may be obtained from monomers for polyaddition reactions. In this case the polymer matrix is formed successively from monomers M without elimination of by-products. An example of this is the preparation of polyurethanes from polyfunctional hydroxy compounds and polyfunctional isocyanates; the preparation of polyureas from polyfunctional amines and polyfunctional isocyanates; the preparation of polyhydroxycarboxylic acids, polyamino acids, polyamides, polyesters, polyimides, polycarbonates, amino resins, phenolic resins, and polysulfides; and the preparation of polyepoxides from polyfunctional epoxides and polyfunctional amines, thiols and/or hydroxy compounds. Examples are polyurethanes formed from isophorone diisocyanates or naphthodiisocyanate and alcohols having a hydricity of two or more, especially octanediol and dodecanediol. Polyurethanes come about, for example, from condensation of isophorone diisocyanate or naphthodiisocyanate with divalent amines, particularly with unsubstituted or substituted phenylenediamines, ethylenediamine, propylenediamine or 1,6-hexylenediamine. Polyepoxides are adducts, for example, of diglycidyl ether, butadiene epoxide or novolak-based polyepoxy resins with polyhydric alcohols, especially glycols, preferably hexanediol.

The polymeric matrix can also be synthesized from the appropriate monomers by means of polycondensation reactions. Polycondensation reactions take place in stages with elimination of by-products. Examples include unipolycondensations, which take place with the involvement of a single monomer M, a hydroxycarboxylic acid or an amino acid, for example, or in which two different monomers are involved, examples being the preparation of polyamides from polyfunctional carboxylic acids and polyfunctional amines or the preparation of polyesters from polyfunctional carboxylic acids and polyfunctional hydroxy compounds. Another example of polycondensations are copolycondensations, where more than two different monomers are involved. Other polymers as well can be prepared by polycondensation from the corresponding monomers, examples being polyimides, polycarbonates, amino resins, phenolic resins, polysulfides or urea resins.

The polymeric matrix can be synthesized preferably from free-radically polymerizable monomers M from the group of acrylic acid, acrylic esters, acrylonitrile, acrylamides, methacrylic acid, methacrylic esters, vinyl alcohols, vinyl ethers, vinylamines, vinyl acetates, vinyl esters, styrenes, maleic esters, maleic anhydride, and maleic acid.

In the case of the free-radical polymerization the monomers M may be composed of monomers of class M1, crosslinking monomers of class M2 and/or hydrophilic monomers of class M3, it being also possible to use mixtures of two or more monomers from the same classes or mixtures of two or more monomers from different classes.

The monomers M1 are preferably selected from:

$C_1$-$C_{20}$ alkyl ester and $C_5$-$C_{10}$ cycloalkyl esters of ethylenically unsaturated monocarboxylic and dicarboxylic acids, especially of acrylic acid and of methacrylic acid. Preferred esters and methyl methacrylate, ethyl methacrylate, n-butyl methacrylate, tert-butyl methacrylate, isobutyl methacrylate, n-hexyl methacrylate, cyclohexyl methacrylate, 2-ethylhexyl methacrylate, methyl acrylate, ethyl acrylate, n-butyl acrylate, tert-butyl acrylate, isobutyl acrylate, cyclohexyl acrylate, and 2-ethylhexyl acrylate;

vinyl esters of $C_1$-$C_8$ monocarboxylic acids, examples being vinyl acetate, vinyl propionate, vinyl butyrate, and vinyl hexanoate; vinylaromatic monomers, especially styrene; $C_2$-$C_6$ olefins, such as ethylene, propene, 1-butene, 2-butene, and isobutene.

The monomers M1 make up in general 20% to 100%, preferably 70% to 99.5%, in particular 80% to 99%, by weight of the monomer mixture M.

It has proven advantageous for the monomers M to include not only the monomers M1 but also crosslinking monomers M2 which contain at least two nonconjugated ethylenically unsaturated double bonds. Suitable monomers M2 include, for example, the vinyl, allyl, methallyl, and tricyclodecenyl esters of the abovementioned ethylenically unsaturated carboxylic acids, particularly of methacrylic acid and of acrylic acid;

the esters of the abovementioned ethylenically unsaturated carboxylic acids with polyhydric alcohols, such as ethylene glycol diacrylate, ethylene glycol dimethacrylate, butanediol diacrylate, butanediol dimethacrylate, hexanediol diacrylate, hexanediol dimethacrylate, triethylene glycol diacrylate, triethylene glycol trimethacrylate, tris(hydroxymethyl)ethane triacrylate and trimethacrylate, and pentaerythritol triacrylate and trimethacrylate;

the allyl and methallyl esters of polyfunctional carboxylic acids, such as diallyl maleate, diallyl fumarate, and diallyl phthalate.

Examples of monomers M2 are divinylbenzene, divinylurea, diallylurea, triallyl cyanurate, N,N'-divinyl- and N,N'-diallylimidazolidin-2-one, and also methylenebisacrylamide and methylenebismethacrylamide.

The monomers M2 make up in general 0% to 30%, preferably 0.1% to 20%, in particular 0.5% to 10%, by weight of the total amount of the monomer mixture M.

The monomers M may further comprise the hydrophilic monomers M3, which are different than the aforementioned monomers M1 and M2. They include monomers whose homopolymers have a heightened water solubility (i.e., >80 g/l at 25° C.). Such monomers M3 serve as modifying monomers. The monomers M3 include monoethylenically unsaturated monomers containing at least one acid group, such as a COOH, $SO_3H$ or $PO_3H_2$ group, which may also be present in salt form (referred to below as anionic monomers), and monoethylenically unsaturated neutral monomers.

Examples of monoethylenically unsaturated anionic monomers are the aforementioned monoethylenically unsaturated monocarboxylic and dicarboxylic acids, especially acrylic acid and methacrylic acid, monoethylenically unsaturated sulfonic acids and phosphonic acids, examples being vinylsulfonic acid, allylsulfonic acid, methallylsulfonic acid, styrenesulfonic acid, vinylnaphthalenesulfonic acid, and (meth)acrylamido-2-methylpropanesulfonic acid, and vinylphosphonic acid, allylphosphonic acid, methallylphosphonic acid, styrenephosphonic acid, and (meth)acrylamido-2-methylpropanephosphonic acid, and also their water-soluble salts, examples being their alkali metal salts or their ammonium salts, particularly their sodium salts.

Examples of monoethylenically unsaturated neutral monomers are, in particular, the amides of monoethylenically unsaturated monocarboxylic and dicarboxylic acids, such as acrylamide, methacrylamide, and also N-vinyl lactams having 3 to 8 C atoms, such as N-vinylpyrrolidone and N-vinyl-caprolactam. Typical monomers M3 are compounds such as acrylic acid, acrylamide or stryenesulfonic acid.

The monomers M3 can make up 0% to 80%, preferably 0.1% to 40%, and in particular 1% to 20%, by weight of the total weight of the monomers M. Where water-soluble monomers M3 are used they diffuse in the course of the polymerization into the oil phase formed from the hydrophobic monomers M1 and, where appropriate, M2.

Preparation of the Pigment-containing Monomer Miniemulsion c):

The aqueous pigment dispersion from (a) and the monomer miniemulsion from (b) are combined and homogenized appropriately in a weight ratio, based on pigment and monomer M, of 5:95 to 95:5, preferably of 50:50 to 90:10, in particular of 75:25 to 85:15. Homogenization takes place, as described above under (b), preferably through the use of ultrasound.

In the course of this operation, via the process known as fission/fusion, there is encapsulation of the pigment P with the monomers M.

Preparation of the Aqueous Dispersion of Polymer-encapsulated Pigments (d):

The aqueous dispersion of polymer-encapsulated pigments is produced by aqueous miniemulsion polymerization of the homogenized pigment-containing monomer miniemulsion (c) whose emulsion droplets contain the pigment in dispersed form and which in contradistinction to convention oil-in-water emulsions have a droplet diameter <1000 nm, in particular <500 nm.

In the case of a polyaddition or polycondensation, the polymerization takes place in general at a temperature of 30° C. to 100° C., preferably 50° C. to 90° C.

In the case of the free-radical addition polymerization the polymerization is carried out in the presence of a polymerization initiator PI.

The polymerization temperatures are guided primarily by the particular initiator system employed, in conventional manner. Typically the polymerization temperatures are situated in the range from 0 to 95° C., preferably in the range from 30 to 90° C. When elevated pressure is employed the polymerization temperature may even be up to 120° C. Polymerization is carried out typically under atmospheric pressure (1 bar).

The amount of initiator employed is generally in the range from 0.1% to 10%, preferably 0.2% to 8%, and frequently in the range from 0.3% to 5%, by weight based on the monomers M.

In this context it is possible in the case of water-soluble polymerization initiators PI to adopt a procedure wherein the pigment-containing monomer miniemulsion, following homogenization, is charged to a reactor and the polymerization initiator PI is added thereto under polymerization conditions, in one portion or in two or more portions or continuously, in accordance with the rate at which it is consumed. Another option is first to add some or all of the polymerization initiator to the emulsion and then to heat it to polymerization temperature.

It is also possible to add some or all of the pigment-containing monomer miniemulsion to the reactor under polymerization conditions in accordance with the rate at which the reaction progresses. It is preferred in this case to supply the polymerization initiator at least partly in parallel with the addition of the pigment-containing monomer miniemulsion to the reactor.

In the case of oil-soluble polymerization initiators PI the polymerization initiator is added preferably prior to the homogenization described above. The subsequent polymerization takes place analogously.

Suitable free-radical polymerization initiators include in principle all those capable of triggering a free-radical addition polymerization. These include peroxides, hydroperoxides, and azo compounds. The free-radical polymerization initiators may both be water-soluble and be oil-soluble, i.e., soluble in the monomers.

Examples of water-soluble initiators are peroxodisulfuric acid and its ammonium salts and alkali metal salts, hydrogen peroxide or low molecular mass hydroperoxides, such as tert-butyl hydroperoxide, or saltlike azo compounds, an example being 2,2'-azobis-2-amidinopropane dihydrohalide.

Examples of oil-soluble polymerization initiators are hydrophobic azo initiators, an example being AIBN (azoisobutyronitrile), and additionally $C_4$-$C_{12}$ peroxocarboxylic acids and their esters, peroctanoates for example, and perbenzoates, such as tert-butyl peroctanoate and tert-butyl perbenzoate, and also diacyl peroxides, such as dibenzoyl peroxide.

The aforementioned water-soluble peroxidic polymerization initiators can also be combined with a reducing agent and, where appropriate, with a metal compound which is soluble in the aqueous medium (the resulting systems then being referred to as redox initiator systems). These are sufficiently well known to the skilled worker. Examples of particularly preferred free-radical polymerization initiators are AIBN (azoisobutyronitrile) or MCPBA (3-chloroperbenzoic acid).

The Polymer Matrix:

In the course of the polymerization, the pigment is encapsulated with a polymer matrix. The average particle size (particle diameter) of the polymer-encapsulated pigment particles is situated preferably in the range from 50 to 500 nm and in particular in the range from 70 to 300 nm. The average particle size corresponds to the intensity average, which can be determined in conventional manner by quasielastic light scattering on a dilute aqueous dispersion of the polymer-encapsulated pigment particles (calculated by unimodal analysis of the autocorrelation function). The measurements are undertaken in general on 0.1% by weight samples under standard conditions (1 bar, 25° C.).

The species homogeneity is determined by means of ultracentrifugation in a sugar gradient (household sugar, gradient in 4 steps from 0% sugar up to a saturated aqueous sugar solution).

Pigment-containing Polymer Powders:

The present invention also provides pigment particles encapsulated by a polymer shell, the pigment being an organic pigment P from the group of azo, isoindolinone, isoindoline, anthanthrone, thioindigo, thiazineindigo, triarylcarbonium, quinophthalone, anthraquinone, dioxazine, phthalocyanine, quinacridone, quinacridonequinone, indanthrone, perylene, perinone, pyranthrone, diketopyrrolopyrrole, isoviolanthrone, and azomethine pigments;

the polymer-encapsulated pigment particles have an average particle size di (intensity average) between 30 and 600 nm;

the pigment content of the polymer-encapsulated pigment particles is 5% to 95% by weight, preferably 50% to 90% by weight, in particular 75% to 85% by weight, and the homopolymer particle content is less than 5% by weight, preferably less than 4% by weight, in particular less than 3% by weight, based on the total weight of the encapsulated pigment particles. In general the homopolymer particle content is between 0.01% and 4.9% by weight, often between 0.1% and 3.9% by weight, and mostly between 0.5% and 2.0% by weight. The particle species distribution, i.e., the deviation of the individual particles from one another in terms of their size, is usually less than 20%, in particular less than 10%, and the deviation in terms of their pigment content is usually less than 5%, preferably less than 3%, in particular less than 2%.

Preferred Pigments are C.I. Pigment Yellow 83, 74, P. Red 122, and P. Blue 15:3.

The polymer-encapsulated pigment powder can be obtained by evaporating the volatile constituents of the aqueous dispersion of polymer-encapsulated pigments. The volatile constituents are evaporated in the same way as for known methods of powder production from aqueous polymer dispersions. Surprisingly it is possible to evaporate the volatile constituents even without the typically required addition of spraying assistants. In contradistinction to what is the case for conventional polymer dispersions, the dispersions of the invention do not exhibit any unwanted irreversible aggregation of the polymer-encapsulated pigment particles while the volatile constituents are being evaporated off. It is therefore easy to redisperse the polymer-encapsulated pigment powders in an aqueous phase.

The evaporation of the volatile constituents takes place for example by spray-drying of the polymer-encapsulated pigment dispersion of the invention in a stream of hot air, or by freeze-drying. Methods of spray-drying and of freeze-drying of aqueous dispersions are known to the skilled worker.

Nonvolatile constituents, examples being the surfactants T, can be separated off by means for example of ultracentrifugation, dialysis or membrane filtration.

Applications:

The encapsulated pigment particles of the invention can be used for pigmenting high molecular mass organic materials of natural or synthetic origin, such as plastics, resins, varnishes, paints, electrophotographic toners and developers, electronic materials, color filters, and inks, including printing inks. Examples of high molecular mass organic materials which can be pigmented with the colorants of the invention are cellulose compounds, such as cellulose ethers and cellulose esters, for example, such as ethylcellulose, nitrocellulose, cellulose acetates or cellulose butyrates, natural binders, such as fatty acids, fatty oils, resins and their modification products, or synthetic resins, such as polycondensates, polyadducts, addition polymers and addition copolymers, such as amino resins, especially urea-formaldehyde and melamine-formaldehyde resins, alkyd resins, acrylic resins, phenolic resins, such as novolaks or resoles, urea resins, polyvinyls, such as polyvinyl alcohols, polyvinylacetals, polyvinyl acetates or polyvinyl ethers, polycarbonates, polyolefins, such as polystyrene, polyvinyl chloride, polyethylene or polypropylene, poly(meth)acrylates and their copolymers, such as polyacrylic esters or polyacrylonitriles, polyamides, polyesters, polyurethanes, coumarone-indene resins and hydrocarbon resins, epoxy resins, unsaturated synthetic resins (polyesters, acrylates) with the various curing mechanisms, waxes, aldehyde resins and ketone resins, gum, rubber and its derivatives and latices, casein, silicones and silicone resins; individually or in mixtures. It is unimportant whether the aforementioned high molecular mass organic compounds are in the form of plastic masses or melts or in the form of spinning solutions, dispersions, varnishes, paints or printing inks. Depending on the intended use it proves advantageous to utilize the colorants of the invention as a blend or in the form of prepared products or dispersions. Based on the high molecular mass organic material to be pigmented, the colorants of the invention are employed in an amount of 0.05% to 30%, preferably 0.1% to 15%, by weight.

The colorants of the invention are also suitable for coloring electrophotographic toners and developers, such as one-component or two-component powder toners (also called one-component or two-component developers), magnetic toners, liquid toners, latex toners, polymerization toners, and specialty toners, for example.

Typical toner binders are addition-polymerization resins, polyaddition resins, and polycondensation resins, such as styrene, styrene-acrylate, styrene-butadiene, acrylate, polyester, and phenolic-epoxy resins, polysulfones, polyurethanes, individually or in combination, and also polyethylene and polypropylene, which may also include further ingredients, such as charge control agents, waxes or flow assistants, or may be modified subsequently with these additions.

The colorants of the invention are also suitable, moreover, for coloring powders and powder coating materials, especially triboelectrically or electrokinetically sprayable powder coating materials which are employed for coating the surface of articles made from, for example, metal, wood, plastic, glass, ceramic, concrete, textile material, paper or rubber.

Resins typically used as powder coating resins are epoxy resins, carboxyl-containing and hydroxyl-containing polyester resins, polyurethane resins, and acrylic resins, together with typical hardeners. Combinations of resins also find application. For example, epoxy resins are frequently used in combination with carboxyl-containing and hydroxyl-containing polyester resins. Typical hardener components (depending on the resin system) are, for example, acid anhydrides, imidazoles, and dicyandiamide and derivatives thereof, masked isocyanates, bisacylurethanes, phenolic resins and melamine resins, triglycidyl isocyanurates, oxazolines, and dicarboxylic acids.

The invention further provides for the use of the colorants described for coloring printing inks, particularly for ink-jet inks. By ink-jet inks are meant inks with an aqueous basis (including microemulsion inks) and with a nonaqueous basis (solvent-based inks), UV-curable inks, and those inks which operate in accordance with the hot-melt process.

Solvent-based ink-jet inks contain substantially 0.5% to 30%, preferably 1% to 15%, by weight of the colorants of the invention, 70% to 95% by weight of an organic solvent or solvent mixture and/or of a hydrotropic compound. Where appropriate the solvent-based ink-jet inks may include carrier materials and binders which are soluble in the "solvent", such as polyolefins, natural rubber and synthetic rubber, polyvinyl chloride, vinyl chloride/vinyl acetate copolymers, polyvinylbutyrals, wax/latex systems, or combinations of these compounds. Where appropriate the solvent-based ink-jet inks may also comprise further additives, such as wetting agents, degassers/defoamers, preservatives, and antioxidants.

Microemulsion inks are based on organic solvents, water, and, where appropriate, an additional substance which acts as an interface mediator (surfactant).

Microemulsion inks contain 0.5% to 30%, preferably 1% to 15%, by weight of the colorants of the invention, 0.5% to 95% by weight of water, and 0.5% to 95% by weight of organic solvents and/or interface mediators.

UV-curable inks contain substantially 0.5% to 30% by weight of the colorants of the invention, 0.5% to 95% by weight of water, 0.5% to 95% by weight of an organic solvent or solvent mixture, 0.5% to 50% by weight of a radiation-curable binder, and, if desired, 0% to 10% by weight of a photoinitiator.

Hot-melt inks are based usually on waxes, fatty acids, fatty alcohols or sulfonamides which are solid at room temperature and liquefy on heating, the preferred melting range being between about 60° C. and about 140° C.

Hot-melt ink-jet inks are composed substantially of 20% to 90% by weight of wax and 1% to 10% by weight of the colorants of the invention. There may also be 0% to 20% by weight of an additional polymer (as "dye dissolver"), 0% to 5% by weight of dispersant, 0% to 20% by weight of viscosity modifier, 0% to 20% by weight of plasticizer, 0% to 10% by weight of tack additive, 0% to 10% by weight of transparency stabilizer (which prevents the wax from crystallizing, for example), and 0% to 2% by weight of antioxidant.

The printing inks of the invention, especially ink-jet inks, can be prepared by dispersing the colorant into the microemulsion medium, into the nonaqueous medium or into the medium for preparing the UV-curable ink or into the wax for preparing a hot-melt ink-jet ink.

Appropriately in this case the printing inks obtained are subsequently filtered (through a 1 μm filter, for example) for ink-jet applications.

The printing inks of the invention can be used in ink sets composed of cyan, magenta, yellow, and black, in the set for ink-jet ink sets for covering the color space.

For the purpose of shading the printing inks of the invention it is possible to add dyes.

Furthermore, the colorants of the invention are also suitable for coloring color filters, both for additive and for subtractive color generation, and also as colorants for electronic inks (e-inks) or electronic paper (e-paper).

In the production of color filters, including both reflective and transparent color filters, pigments are applied in the form of a paste or as pigmented photoresists in suitable binders (acrylates, acrylic esters, polyimides, polyvinyl alcohols, epoxides, polyesters, melamines, gelatins, caseins) to the respective LCD components (e.g., TFT-LCD=Thin Film Transistor Liquid Crystal Displays or, e.g., (S) TN-LCD=(Super) Twisted Nematic-LCD). Besides high thermal stability, high pigment purity is a prerequisite for a stable paste and/or a pigmented photoresist. Furthermore, the pigmented color filters can also be applied by ink-jet printing processes or other suitable printing processes.

The percentages in the examples below are by weight.

EXAMPLE 1 a) Producing the aqueous pigment dispersion:

A glass beaker is charged with 200 ml of water and 6 g of SDS (sodium dodecyl sulfate), which are then mixed. 68 g of the pigment powder P.Y. 74 are weighed out into this mixture and predispersed by means of a dissolver at 3500 rpm for 15 minutes. The mixture is then introduced into a bead mill loaded to 85-90% with ceramic beads (0.6-0.8 mm). The mixture is ground at 2000 rpm for 2 hours. Then water (123 ml) is added and grinding is continued for 15 minutes in order to mix in the water homogeneously. The dispersion is then discharged from the mill.

b) Producing the stabilized monomer miniemulsion:

6 g of styrene (monomer M), 250 mg of hexadecane (ultrahydrophobe), and 100 mg of AIBN (polymerization initiator PI) are added to a solution of 72 mg of sodium dodecyl sulfate (surfactant T) in 24 g of water and the mixture is emulsified at the highest magnetic stirrer setting for one hour. This is followed by miniemulsification at 90% amplitude (Branson Sonifier W450) with ice cooling.

c) Producing the pigment-containing monomer miniemulsion:

20 g of a water-diluted 10% pigment dispersion of P.Y. 74 from step a) are admixed with 2.5 g of a 20% styrene miniemulsion from step b) at room temperature and with stirring.

This is followed by further miniemulsification for a further 2 minutes with ice cooling. In the course of this procedure, via the process known as fission/fusion, the pigment is encapsulated with the monomer.

d) Polymerization:

Subsequently the polymerization of the styrene is brought about with stirring by heating to a temperature of 70° C.

The homogeneity of the encapsulated pigments was determined via ultracentrifugation in a sugar gradient and by way of TEM micrographs. The size distribution before and after encapsulation was determined by means of dynamic light scattering (di=intensity average).

EXAMPLE 2

The ratio of pigment to styrene was set to 50/50. Preparation in the same way as in Example 1.

EXAMPLE 3

Production in the same way as in Example 1. Instead of styrene, butyl acrylate was used.

EXAMPLE 4

Production in the same way as in Example 1. Instead of styrene, a mixture of 90% styrene and 10% acrylic acid was used.

EXAMPLE 5

Production in the same way as in Example 1. Instead of PY74, a PY83 was used.

EXAMPLE 6

Production in the same way as in Example 1. Instead of P.Y. 74, P.R. 122 was used, and the amount of AIBN was increased from 100 mg to 250 mg.

EXAMPLE 7

Production in the same way as in Example 1. Instead of P.Y. 74, P.B. 15:3 was used, and the amount of AIBN was increased from 100 mg to 250 mg.

EXAMPLE 8

Encapsulation of polyurethane: Production as in Example 1. Instead of styrene, a mixture of isophorone diisocyanate and dodecanediol in a ratio of 1:1 and, instead of AIBN, dibutyltin laurate were used. The polymerization was carried out at 60° C.

EXAMPLE 9

Production in the same way as in Example 8. Isophorone diisocyanate and dodecanediol were used in a ratio of 1.05:1.

EXAMPLE 10

Production in the same way as in Example 8. Isophorone diisocyanate and dodecanediol were used in a ratio of 1.1:1.

EXAMPLE 11

Production in the same way as in Example 8. Instead of dodecanediol, ocatanediol was used.

EXAMPLE 12

Encapsulation with polyesters: Production in the same way as in Example 1. Instead of styrene, pentadecanolide (1-oxacyclohexadecan-2-one) without a catalyst was used. The polymerization to form poly-o-hydroxypentadecanoic ester was carried out at 30-40° C. by the addition of the enzyme lipase PS (0.5% based on the monomer).

EXAMPLE 13

Production in the same way as for Example 12, the solids content having been set to 7.3% by addition of water prior to the beginning of the polymerization.

TABLE 1

Size distribution before and after encapsulation, determined by dynamic light scattering

| | Ratio pigment/polymer | di [nm] (from dynamic light scattering) |
|---|---|---|
| PY74 | 100/0 | 127 |
| Example 1 | 80/20 | 160 |
| Example 2 | 50/50 | 190 |
| Example 3 | 80/20 | 170 |
| Example 4 | 80/20 | 208 |
| PY83 | 100/0 | 162 |
| Example 5 | 80/20 | 166 |
| PR122 | 100/0 | <110 |
| Example 6 | 80/20 | 149 |
| PB15:3 | 100/0 | <100 |
| Example 7 | 80/20 | 115 |
| PY74 | 100/0 | 127 |
| Example 8 | 80/20 | 156 |
| Example 9 | 80/20 | 138 |
| Example 10 | 80/20 | 300 |
| Example 11 | 80/20 | 481 |
| Example 12 | 80/20 | 499 |
| Example 13 | 80/20 | 279 |

In all of the examples the polymer-encapsulated pigment particles obtained were investigated by ultracentrifugation in a density gradient and also by TEM micrographs. Virtually no homopolymer particles (empty droplets) were detected.

The invention claimed is:

1. A method of producing an aqueous dispersion of polymer-encapsulated pigment, comprising the steps of:
   (a) preparing an aqueous pigment dispersion comprising at least one organic pigment P selected from the group consisting of azo, isoindolinone, isoindoline, anthanthrone, thioindigo, thiazineindigo, triarylcarbonium, quinophthalone, anthraquinone, dioxazine, phthalocyanine, quinacridone, quinacridonequinone, indanthrone, perylene, perinone, pyranthrone, diketopyrrolopyrrole, isoviolanthrone, and azomethine pigments, at least one surfactant T, and water;
   (b) providing a monomer miniemulsion stabilized by a hydrophobic organic compound having a water solubility at 20° C. of not more than $5\times10^{-5}$ g/l and and wherein the monomer miniemulsion includes at least one polymerizable monomer M, at least one surfactant T1 and water, wherein the miniemulsion is in the form of droplets and wherein the droplets have a size of less than or equal to 1000 nm by a homogenization step;
   (c) producing a pigment-containing monomer miniemulsion by combining and homogenizing the aqueous pigment dispersion from step (a) and the monomer miniemulsion from step (b), and
   (d) polymerizing the pigment-containing monomer miniemulsion from step (c) in the presence of a polymerization initiator by heat or both to form the polymer-encapsulated pigment, wherein the polymer-encapsulated pigment has a homopolymer content of less than 5% by weight based on the total weight of the encapsulated pigment particles.

2. The method as claimed in claim 1, wherein in step (a) the pigment P is pasted together with the surfactant T in water and the paste is dispersed with the aid of a grinding or dispersing assembly.

3. The method as claimed in claim 1, wherein in step (a) the surfactant T is used in an amount of 0.1% to 50% by weight, based on the total weight of the aqueous pigment dispersion.

4. The method as claimed in claim 1, wherein the surfactant T and T1 are the same or different and are selected from the group consisting of phosphates, carboxylates, polymeric ethoxylates, fatty amines, fatty amine ethoxylates, fatty alcohol ethoxylates, fatty acid salts, alkylsulfonates, alkyl sulfates, alkylammonium salts, and sugar ethoxylates.

5. The method as claimed in claim 1, wherein in step (a) the at least one pigment P is used in an amount of 0.1% to 50% by weight, based on the total weight of the aqueous pigment dispersion.

6. The method as claimed in claim 1, wherein in step (b) the at least one polymerizable monomer M is incorporated by stirring into an aqueous solution of the surfactant T1, and the hydrophobic organic compound having a water solubility at 20° C. of not more than $5 \times 10^{-5}$ g/l is added to form a mixture, and the mixture is homogenized to form the monomer miniemulsion.

7. The method as claimed in claim 1, wherein the at least one polymerizable monomer M is a free-radically polymerizable compound selected from the group consisting of acrylic acid, acrylic esters, acrylonitrile, acrylamides, methacrylic acid, methacrylic esters, vinyl alcohols, vinyl ethers, vinylamines, vinyl acetates, vinyl esters, styrenes, maleic esters, maleic anhydride, and maleic acid.

8. The method as claimed in claim 1, wherein the polymer of the polymer-encapsulated pigment is selected from the group consisting of polyhydroxycarboxylic acids, polyamino acids, polyamides, polyesters, polyimides, polycarbonates, amino resins, phenolic resins, polysulfides, polyepoxides, and urea resins.

9. The method as claimed in claim 1, wherein the polymer of the polymer-encapsulated pigment is selected from the group consisting of polyurethanes, polyureas, and polyepoxides.

10. The method as claimed in claim 1, wherein in step (b) the at least one polymerizable monomer M is added in an amount of 0.1% to 80% by weight, based on the total weight of the polymerizable monomer miniemulsion.

11. The method as claimed in claim 1, wherein in step (b) the surfactant T1 is added in an amount of 0.1% to 50% by weight, based on the total weight of the at least one polymerizable monomer M.

12. The method as claimed in claim 1, wherein in step (b) the hydrophobic organic compound is added in an amount of 1% to 50% by weight, based on the total weight of the at least one polymerizable monomer M.

13. The method as claimed in claim 1, wherein in step (c) the aqueous pigment dispersion from (a) and the monomer miniemulsion from (b) are combined in a weight ratio of 5:95 to 95:5, based on the weight of the at least one polymerizable monomer M and the weight of the at least one organic pigment P.

14. The method as claimed in claim 1, where in step (c) the homogenization is accomplished by exposure to ultrasound.

* * * * *